538-140. OR 3,719,778 SR 3/140

United States

Green

[11] 3,719,778

[45] March 6, 1973

[54] MULTIELECTRODE SIGNAL PLATE STORAGE TUBE FOR STANDARDS CONVERSION OF ELECTRICAL SIGNALS

[75] Inventor: Martin Green, Big Flats, N.Y.

[73] Assignee: Westinghouse Electric Corporation, Pittsburgh, Pa.

[22] Filed: March 2, 1971

[21] Appl. No.: 120,280

[52] U.S. Cl. ....178/6.8, 178/DIG. 24

[51] Int. Cl. ....H04n 5/02

[58] Field of Search ....178/DIG. 24, 6.8; 313/68 R, 313/69 R; 315/13

[56] References Cited

UNITED STATES PATENTS

| | | | |
|---|---|---|---|
| 2,867,686 | 1/1959 | Hafner | 178/6.8 |
| 3,401,299 | 9/1968 | Crowell | 178/6.8 |

OTHER PUBLICATIONS

"Scan Converter Tubes and Their Applications," Information Display, May, June 1965, pp. 14–30.

*Primary Examiner*—Robert L. Griffin
*Assistant Examiner*—Donald E. Stout
*Attorney*—F. H. Henson and C. F. Renz

[57] ABSTRACT

An electrical signal conversion system is provided which includes a multielectrode signal plate storage electrode for conversion of electrical signals of a first scan rate into electrical signals of a second scan rate.

5 Claims, 4 Drawing Figures

MULTIELECTRODE SIGNAL PLATE STORAGE TUBE FOR STANDARDS CONVERSION OF ELECTRICAL SIGNALS

BACKGROUND OF THE INVENTION

In several different types of applications, video information may be transmitted at a slow frame rate because of bandwidth limitations of the system. To present a flicker-free image to a viewer, it is necessary to store each slow frame and then scan it several times at normal and faster rates to generate the conventional thirty standard frames per second. For example, if the slow rate is 1/N times the frames per second of the standard rate, a necessary condition for freedom from flicker is that the storage target must be capable of supplying N readout frames at the standard rate between each recharging scan by the slow input so that the frames do not differ too much in amplitude. This is normally accomplished by utilizing a laggy storage target. Such a solution has at least one disadvantage. The storage characteristics of a laggy target does not merely provide a high output for N frames, but continues to give an output in the N + 1th standard frame from the first slow frame when new information has already been written by the second slow frame. Thus, the performance of a standard scan converter must always represent a compromise between freedom from flicker and image smear caused by excessive lag of the target. A silicon diode target control system is described in U.S. Pat. No. 3,467,880.

Another possible application of the invention is within a field sequential color system wherein it is necessary by some manner to record the red, blue and green fields and then read these signals out simultaneously in a single scan.

SUMMARY OF THE INVENTION

A scan conversion system which includes a multielectrode signal plate to permit writing of an image of a first scan rate and readout of said image at a second scan rate and control the lag of the target.

BRIEF DESCRIPTION OF THE DRAWING

The invention will become more readily apparent from the following exemplary description in connection with the accompanying drawings, in which.

DESCRIPTION OF THE PREFERRED EMBODIMENTS

Figure 1:
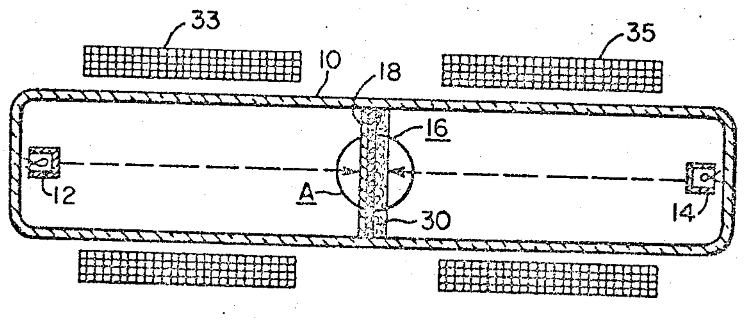
FIG. 1 is a schematic showing of a scan converter in accordance with the teachings of this invention.

Referring in detail to FIG. 1, there is shown a double-ended scan converter tube utilizing a multielectrode signal plate to achieve accurately controlled and electrically variable lag characteristics. The scan converter of FIG. 1 includes an evacuated envelope 10 and having therein a write electron gun 12 positioned at one end of the envelope 10 and a read electron gun 14 positioned at the opposite end of the envelope 10. A storage target electrode 16 is positioned between the electron guns 12 and 14. The target electrode 16 is comprised of at least a storage layer 30 and a multielectrode backplate 20. In the specific embodiment shown in FIG. 2, a thin support layer 18 of about 100 Angstroms in thickness and of a suitable material such as aluminum oxide is provided. The multielectrode signal plate structure 20 is comprised of a plurality of parallel electrical conducting strips 22 arranged perpendicular to the horizontal scan direction. The strips 22 may have a thickness of about 500 Angstroms. The strips 22 are spaced apart to provide electrical isolation. Each strip 22 is electrically interconnected to the next third strip 22 to form three interleaved signal plates 24, 26 and 28. The conducting strips 22 may be deposited by evaporating through a suitable mesh to form the conducting strips 22. The strips 22 may be of a suitable electrical conducting material such as gold. The signal strips 22 may be interconnected at the edge of the target to form the three separate signal electrodes 24, 26 and 28.

The active target material layer 30 is of a suitable storage material such as a porous layer of a suitable alkaline or alkaline earth metal compound such as potassium chloride which exhibits the property of conduction of electrons through the voids in the porous layer. The structure and fabrication of the layer 30, known as a (SEC) type target secondary electron conduction, is more specifically described in U.S. Pat. No. 3,213,316. The layer 30 may have a thickness of about 20 microns and a density of less than 10 percent of its bulk density.

In the operation of the device, an input signal having a 10 frame per second signal for example, may be applied to the write gun 12 in a well known manner. The electron beam from the write gun 12 is scanned by suitable deflection means such as a coil 33, in a raster over the target 16 and will write a charge image on the exposed surface of the porous layer 30 facing the read gun 14. The write electrom beam penetrates the electron transmissive conductive strips 22 and support layer 18. The cathode of the write gun 12 may be operated at a negative potential of about 7000 volts and the strips 22 in a potential range of about negative 15 to positive 15 volts.

The readout of this ten frames per second signal may be accomplished by the utilization of a 30 frame per second scan rate on the read gun 14. The cathode of the read gun 14 may be operated at about ground. Suitable accelerating potential electrodes are provided to direct the beam onto the surface of layer 30. The deflection of the electron beam from the electron gun 14 may be accomplished by suitable deflection means such as coil 35. By applying a positive potential of about +15 volts to the back-plate 24 of the multiple backplates 24, 26 or 28, the signal will be read out from the porous layer 30 in those areas above the grid 24. The write charge on the porous surface in front of the grid 24 will be completely erased. The grids 26 and 28 during this first scan will be operated at a potential of about −1 volt so that the electron beam from the read gun 14 will not affect the porous layer 30 positioned over the grids 26 and 28. In this manner, a signal will be obtained from the backplate grid 24 representative of the input signal applied to the porous layer 30 above the strip 22 forming the grid 24. The next step in operation is to apply a positive voltage of about 15 volts to the backplate grid 26 and negative voltage of about one volt to the backplate grids 24 and 28 and then read out the information above the grid 26. The next step in the operation is to apply negative potentials to the grids 24 and 26 and apply a positive potential to the grid 28 and read out the information above the grid 28. Thus, the entire target 16 is read out in three scan rasters by the read gun 14.

In this manner, only one-third of the target 16 is discharged for each scan of the read gun 14. The result is that for each slow scan frame written onto the target 16 by the write gun 12, three exactly equal amplitudes standard scan frames are produced by the read gun 14. Because of the lag free nature of the SEC target when these three read out frames are completed, essentially no trace of the slow scan frame remains on the target 16 after readout. It is as if the target 16 were infinitely laggy for three frames, then becomes extremely fast.

By using, for example, a multielectrode signal plate with four interleaved sets of electrode strips 22, it would be possible to produce a four frame lag. It would also be possible to utilize four interleaved sets of electrodes, with alternate grids interconnected to provide a two frame lag. In addition, of course, it is obvious that one could tie all of the interleaved structures to a single potential and obtain a one frame readout if desired.

An SEC type target has been described in the specific embodiment. It is obvious that other types of storage layers could be utilized such as electron bombardment induced conductivity and silicon diodes types. It is also possible, by utilizing a storage material such as electron bombardment induced conductivity type where the target itself has a natural lag characteristic, to obtain several readout scans from each set of electrodes and thereby provide scan conversion ratios much greater than 4:1. The effective lag could still be varied over a 4:1 ratio by suitably interconnecting sets of electrodes.

Figures 3, 4:
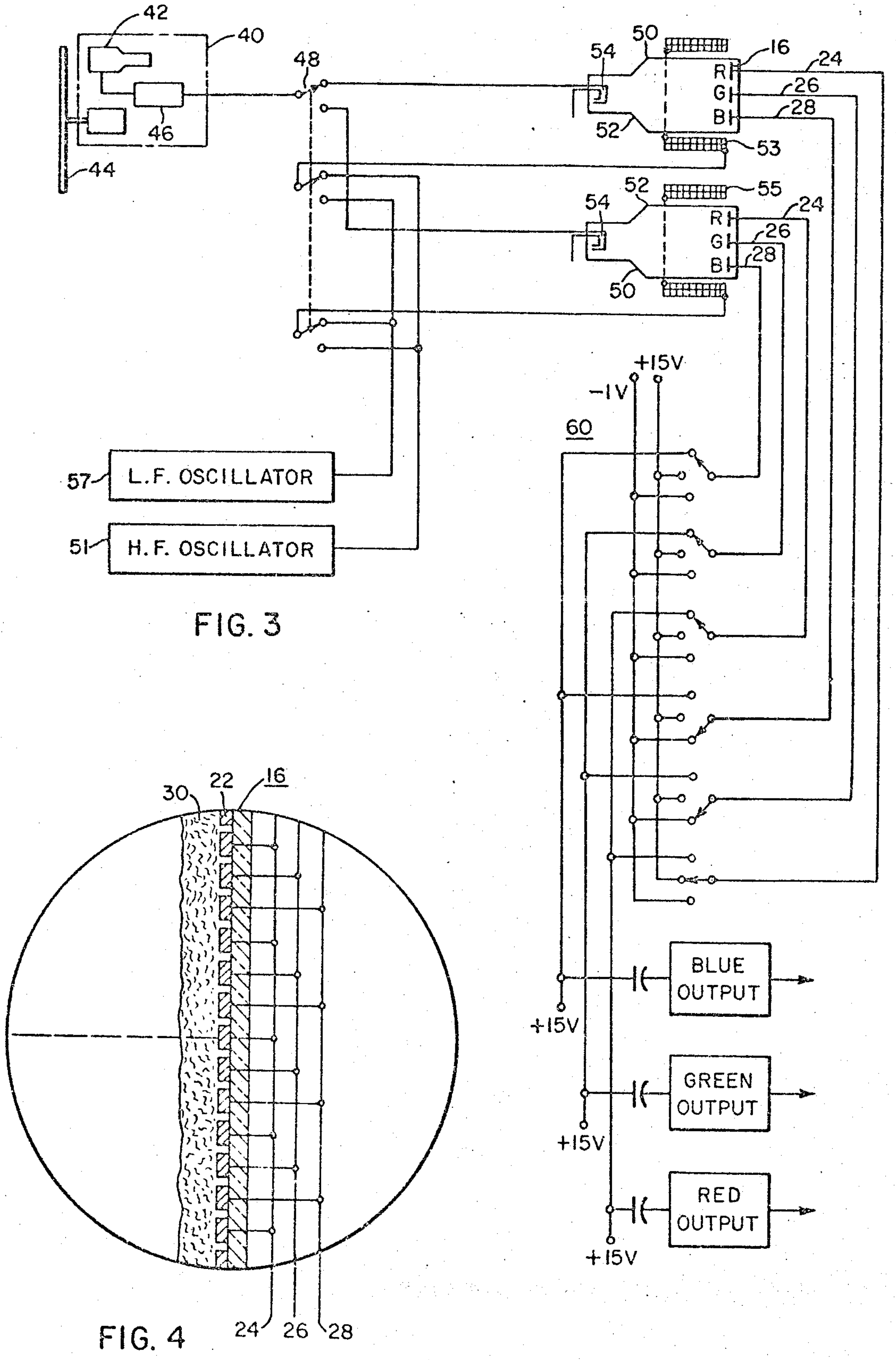
FIG. 3 is a schematic showing of multielectrode scan target storage tubes incorporated into a color sequential television system incorporating the teachings of this invention.
FIG. 4 is an enlarged view of the target structure of the scan converter tubes of FIG. 3.

Referring now to FIGS. 3 and 4, a field sequential color television system is illustrated incorporating the teachings of this invention. The rectangle 40 represents a color television camera comprising a pickup tube 42 of a suitable type such as an SEC pickup tube as described in U.S. Pat. No. 3,213,316. A rotating color filter wheel 44 is provided. The color wheel 44 includes sectors transmissive to red, green and blue light and rotates at such a speed that during one scanning of the field by the pickup tube 42, the target is illuminated only by red. The next field would be green and the next blue so as to provide a red field, a blue field, and then a green field, sequentially. The signal from the pickup tube 42 is coupled through a suitable amplifier 46 and a switching member 48 to a storage system. In the position indicated, the switch 48 connects the electrical signal from the pickup tube 42 to a first scan converter tube 50. The time for the scanning of the field on the pickup tube 42 is 1/180 of a second. The scanning time of the storage tube 50 is also 1/180 of a second. A high frequency oscillator 51 is connected through the switching means 48 to a deflection system 53 for the first tube 50.

Figure 2:
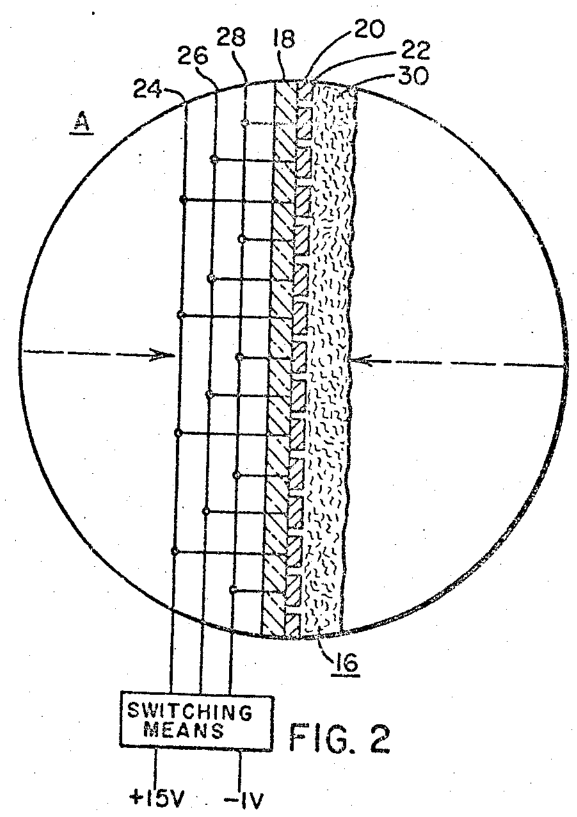
FIG. 2 is an enlarged view of portion A of FIG. 1.

The storage tube 50 includes a target structure 16 shown in FIG. 4, which may be similar to that described with respect to FIGS. 1 and 2. The target structure 16 is positioned at one end of the envelope 52. An electron gun 54 is provided at the opposite end of the envelope for scanning a raster over the porous storage layer 30 of the target 16. In the writing operation, the electron gun 54 generates an electron beam. The writing beam is directed onto the target 16 and is scanned over the target 16 by the deflection means 53. If information representative of red information is incoming, then a suitable switching means 60 connects a positive bias of about 15 volts is connected to the interleaved grid 24 while the other two grids 26 and 28 are connected to a negative potential of 1 volt. The cathode of the electron gun 54 may be at about ground potential. The video may be applied to the control grid of the electron gun 54. In this manner, the red information is written into the porous layer 30 above the grid 24 and the electron beam does not affect the other areas. After the completion of the scanning of the red image, the switching member 60 switches to provide the positive bias to the grid 26 and negative bias to the grids 24 and 28. In this scan cycle, the information representing the green image will be written into the target 36 over the porous layer 30 above the grid 26. In the blue sector scan, the grid 28 will have a positive bias and the grids 24 and 26 will have a negative bias and the information will be written into the porous layer 30 above the grid 28.

At the completion of the three colors written into the storage target 16, the switch 48 moves to a second position so as to connect the video information from the camera 42 to the second storage tube 50, and this writing process is applied to the second storage tube 50 while the information on the first storage tube is read out. While the information is being written into the first tube 50, the deflection system 55 of the second tube 50 is connected by the switch 48 to an oscillator 57 which scans at the normal scanning rate of one field for 1/60 of a second. During the read out of the second storage tube 50, the three backplate grids 24, 26 and 28 of the second storage tube 50 are connected to an output circuit by switch 60 to provide red, blue and green color output signals suitable for NTSC systems. A voltage of positive 15 volts is applied to the backplate grids 24, 26 and 28 during this read out cycle. The first and second storage tube 50 alternate as read out and write in of information.

It is of course obvious that the input from the color camera 40 may be either applied to the control grid of the electron gun 54 or may be applied to the interleaved grids 24, 26 and 28 to write the desired information thereon.

Since numerous changes may be made in the above-described apparatus and different embodiments of the invention may be made without departing from the spirit thereof, it is intended that all matter contained in the foregoing description and as shown in the accompanying drawings, shall be interpreted as illustrative and not in a limiting sense.

I claim as my invention:

1. A scan converter comprising a target member, said target member comprising a layer of insulating porous material exhibiting the property of storage of charge in response to electron bombardment, a plurality of electrical conductive strips disposed on only a first side of said insulating layer and interconnected to provide at least a first and second group of strips, means for repetitively scanning said first side of said insulating layer to provide a charge image on the second side of said insulating layer, means for reading out said charge image on said second side of said insulating layer, said reading means comprising means for repetitively scanning said second side of said insulating layer with an electron beam, switching means for applying to said first group a first voltage and to said second group a second voltage more negative than said first voltage to read out during one scan the charge image on said first side of said insulating layer associated with said first group and then interchanging said first and second voltages with said first and second groups to read out during one scan the charge image of said first side of said insulating layer associated with said second group.

2. The scan converter set forth in claim 1 in which said insulating layer is a porous layer having a density of less than 10 percent of its bulk density.

3. The scan converter of claim 1 in which the means for repetitively scanning said first side of said insulating layer provides less repetitive scans of said target than said means for repetitively scanning said second side of said insulating layer for a given period of time.

4. A television signal transmission system comprising converting means for converting applied television signals having a first scanning rate into television signals of a second scanning rate, said converter comprising an evacuated envelope and having therein a target member, means for generating a writing electron beam and directing said electron beam over said target, means for deflecting said writing electron beam over said target at a first scanning rate to write a charge image on the surface of said target representative of the modulation on said writing electron beam, means for generating a reading electron beam, means for deflecting said reading electron beam over said target at a second scanning rate to read out the charge image on the surface of said target, said target comprising a storage layer material facing said means for generating said reading electron beam, said target provided with a plurality of electrical conductive strips on the opposite surface of said storage layer with respect to said reading electron beam generating means, said conductive strips being substantially perpendicular to the linear scan of said reading and writing electron beams, said conductive strips connected to provide at least a first and second electrically separate conductive strip groups and circuit means associated with said groups to permit the readout of information associated with said first group during a first scan and the readout of the information associated with said second group during a second scan.

5. A television signal transmission system comprising converting means for converting applied television signals having a first scanning rate into television signals of a second scanning rate, said converter comprising an evacuated envelope having therein an electron gun for generating an electron beam, a target member positioned from said electron gun for intercepting said electron beam, means for deflecting said electron beam over said target in a predetermined manner such that it excites said target in substantially a plurality of parallel lines, said target comprising a support member, at least first and second sets of electrically conductive strips positioned to be transverse to said linear scan with said sets interleaved, a porous layer of material covering said conductive strips and facing said electron gun, a first circuit means associated with said converter means and said electron beam to write and store a first signal on said target associated with said first set of strips at said first scanning rate without affecting the target portion associated with the second set of strips and then writing and storing a second signal on said target associated with said second set of strips at said first scanning rate without affecting the target portion associated with said first set of strips and a second circuit means to to read-out said stored first and second signals at a second scanning rate.

* * * * *